US012059919B2

(12) United States Patent
Guerard et al.

(10) Patent No.: US 12,059,919 B2
(45) Date of Patent: Aug. 13, 2024

(54) METHOD FOR PRODUCING AN ELECTRONIC DOCUMENT COMPRISING A CONCEALED MAGNETIC STRIP, AND ELECTRONIC DOCUMENT THEREBY OBTAINED

(71) Applicant: Idemia France, Courbevoie (FR)

(72) Inventors: Denis Guerard, Courbevoie (FR); Jean-François Boschet, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 17/757,415

(22) PCT Filed: Dec. 16, 2020

(86) PCT No.: PCT/FR2020/052480
§ 371 (c)(1),
(2) Date: Jun. 15, 2022

(87) PCT Pub. No.: WO2021/123625
PCT Pub. Date: Jun. 24, 2021

(65) Prior Publication Data
US 2023/0020171 A1 Jan. 19, 2023

(30) Foreign Application Priority Data
Dec. 20, 2019 (FR) ........................................ 1915095

(51) Int. Cl.
*B42D 25/40* (2014.01)
*B41M 3/14* (2006.01)
(Continued)

(52) U.S. Cl.
CPC ............. *B42D 25/369* (2014.10); *B41M 3/14* (2013.01); *B42D 25/40* (2014.10); *B42D 25/475* (2014.10); *B42D 25/47* (2014.10)

(58) Field of Classification Search
CPC .................. B42D 25/40; B42D 25/475; G09K 19/06196; G09K 19/06187
(Continued)

(56) References Cited

U.S. PATENT DOCUMENTS 4,100,011 A * 7/1978 Foote ..................... B42D 25/45
156/273.1
4,849,618 A * 7/1989 Namikawa ............. G06K 19/08
235/487
(Continued)

FOREIGN PATENT DOCUMENTS

DE 102006023084 A1 11/2007
JP 2001191690 A 7/2001
(Continued)

OTHER PUBLICATIONS

What is Delta E? https://www.viewsonic.com/library/creative-work/what-is-delta-e-and-why-is-it-important-for-color-accuracy/ (Year: 2023).*

*Primary Examiner* — Kyle R Grabowski
(74) *Attorney, Agent, or Firm* — NIXON & VANDERHYE

(57) ABSTRACT

A method for producing an electronic document including a concealed magnetic strip, comprising a step of providing a surface of an electronic document body, a step of applying of a magnetic strip to at least part of the surface of the electronic document body, a visible surface, formed by the surface of the body covered at least in part by the magnetic strip, having a Delta E contrast equal to or less than 15, and a step of applying a decor that covers the surface of the body over the magnetic strip, the decor having a thickness of at most 10 μm and having an opacity ratio at wavelengths in the visible domain of at least 70%; and a corresponding electronic document.

15 Claims, 4 Drawing Sheets

Figure 1:
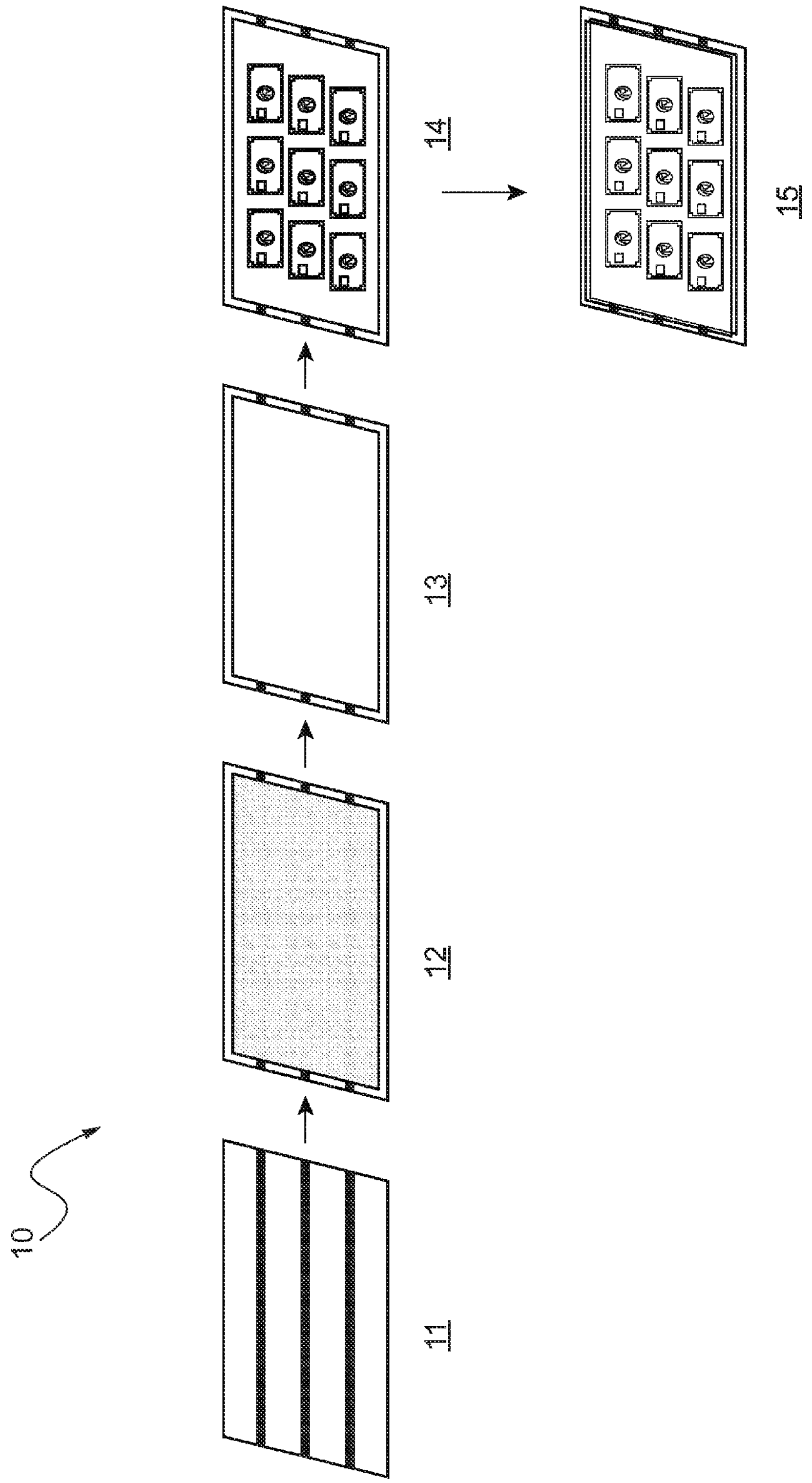

(51) Int. Cl.

| | |
|---|---|
| ***B42D 25/369*** | (2014.01) |
| ***B42D 25/475*** | (2014.01) |
| *B42D 25/47* | (2014.01) |

(58) Field of Classification Search

USPC .......................................... 283/904; 235/493

See application file for complete search history.

(56) References Cited

U.S. PATENT DOCUMENTS

| | | | | |
|---|---|---|---|---|
| 5,383,687 | A | 1/1995 | Suess et al. | |
| 6,186,398 | B1 * | 2/2001 | Kato | G06K 19/06196 428/611 |
| 8,397,998 | B1 * | 3/2013 | Mann | G06K 7/084 235/487 |
| 2010/0264226 | A1 * | 10/2010 | Loughran | B42D 25/00 235/487 |
| 2011/0031319 | A1 | 2/2011 | Kiekhaefer et al. | |

FOREIGN PATENT DOCUMENTS

| | | | | |
|---|---|---|---|---|
| WO | WO-2005116994 | A1 * | 12/2005 | G06K 19/06196 |
| WO | WO-2006003985 | A1 * | 1/2006 | B42D 25/45 |

* cited by examiner

METHOD FOR PRODUCING AN ELECTRONIC DOCUMENT COMPRISING A CONCEALED MAGNETIC STRIP, AND ELECTRONIC DOCUMENT THEREBY OBTAINED

The present invention relates to a method for producing an electronic document, and more particularly an electronic document comprising a concealed magnetic strip. It also relates to the electronic document thereby obtained by such a method.

Conventionally, to produce an electronic document comprising a concealed magnetic strip, the magnetic strip (which is usually black) is applied to a backing (which is usually white), then a concealing layer is applied over the magnetic strip to reduce the contrast between the black of the magnetic strip and the white of the backing. For this, the concealing layer often corresponds for example to a gray layer, for example by a layer produced by printing a silver ink.

Document DE 102006 023084 A1, for example, describes a document, such as a credit card, which comprises a magnetic layer on one of its surfaces, and a reflective, non-electrically conductive layer, placed over the magnetic layer.

However, a decor is generally produced on the surface of the document.

Additionally, the decor often comprises a background layer, generally white, on which the patterns or illustrations are produced.

The magnetic strip is then found not only under the concealing layer, but also under the decor.

However, the more the magnetic strip is covered, the more the quality of the response of the magnetic strip is diminished.

One possibility for improving this shortcoming is to use a magnetic strip of greater amplitudes, which can for example be obtained by a particular physical structure.

Typically, to correctly conceal such a magnetic strip, it is preferable to apply at least one concealing layer having a total thickness that is then at least 4 μm.

With such a reinforced magnetic strip, all of the layers applied on top (i.e., concealing layer(s) and decor) then represent a thickness generally comprising between about 7 μm and 12 μm.

However, even with a reinforced magnetic strip, it is very difficult to obtain a product whose magnetic strip efficiency complies with the requirements of ISO standards.

Thus, the effectiveness of a magnetic strip in an electronic document depends not only on the amplitudes of the magnetic strip, but also on the thickness of the various layers that cover the magnetic strip.

In this context, an objective of the present invention is to at least partially overcome the aforementioned shortcomings, while also being able to bring about other advantages.

To this end, according to a first aspect, a method for producing an electronic document comprising a concealed magnetic strip is proposed comprising:

- A step for providing a surface of an electronic document body;
- A step of applying a magnetic strip to at least part of the surface of the electronic document body, a visible surface, formed by the surface of the body covered at least in part by the magnetic strip, having a Delta E contrast equal to or less than 15, or even 10; and
- A step of applying a decor covering the surface of the body over the magnetic strip, the decor having a thickness of at most 10 μm and having an opacity ratio at wavelengths in the visible domain of at least 70%.

The magnetic strip is thus located between the surface of the body and the decor.

According to the invention, the magnetic strip conceals at least part of the surface of the body. A part of the surface of the body that is unmasked is then a complementary part of the masked part.

The visible surface is then formed by the magnetic strip and the complementary part.

The Delta E contrast then mainly relates to a demarcation between a color of the magnetic strip, called the first color, and a color of the surface of the electronic document body on which the magnetic strip is applied, called the second color.

In a particular embodiment, the magnetic strip covers the entire surface of the body.

In other words, the step of applying the magnetic strip to at least part of the surface of the body then comprises applying the magnetic strip to the entire surface of the body.

In this case, the visible surface is formed only by the magnetic strip. The Delta E contrast is then 0 (zero).

It is then even more difficult, if not impossible, to identify a demarcation between the magnetic strip and the part of the surface of the body that is not masked.

The Delta E contrast is advantageously here the measurement of the color deviation defined by the International Committee on Illumination (CIE). A method is for example described in the 1976 CIE standard: ISO 11664.

Thus, for example, the Delta E, dE or even ΔE, is defined as a measure of Euclidean distance between two colors considered in a color space. The formula established in 1976 by the CIE is for example:

$$\Delta E^* = \sqrt{(L^*_2 - L^*_1)^2 + (a^*_2 - a^*_1)^2 + (b^*_2 - b^*_1)^2}$$

Where:

$L_1^*$, $a_1^*$ and $b_1^*$ are the coordinates in the CIELAB color space of the first color to be considered, and $L_2^*$, $a_2^*$ and $b_2^*$ are those of the second one.

However, there are other formulas for calculating Delta E (CIE 1976, CIE 1994, CIE 2000, CMC).

The wavelength in the visible domain here refer to wavelengths between about 380 nm and 780 nm.

The decor is herein considered to be opaque when it has an opacity ratio, i.e. its ability to obscure, its masking power under lighting of medium intensity, of at least 70%, or even 75%, or even 80%, or even 85%, or even 90%, and even 95%.

Thus, the decor is designed to present an opacity in the visible field such that a demarcation between the backing and the magnetic strip is concealed under normal lighting, i.e., natural lighting, or that common in a building, or that which is very difficult, if not impossible, to identify whether the magnetic strip covers the entire surface.

A magnetic strip can be visually detected because of two effects, the contrast with the surface of the body, or the difference in brightness.

Reducing the contrast is therefore often insufficient to conceal the magnetic strip. And if the magnetic strip covers the entire surface, the absence of decor at least makes it possible to know.

The opacity of the decor and the Delta E contrast thus form an adjustable couple herein to obtain the desired concealing of the magnetic strip.

Indeed, the higher the Delta E contrast, the more the decor must be opaque in turn.

Conversely, the lower the Delta E contrast, the less the decor needs to be opaque. In other words, it can then have a relatively lower opacity, for example 75%, or even 70%.

It is thus possible, in particular by reducing the Delta E contrast, to reduce the total thickness of layers applied over the magnetic strip for an electronic document with a concealed magnetic strip.

This thus makes it possible to better comply with the amplitude criteria of the magnetic strip set by the standards.

At the same time, the permissible layer thickness above the magnetic strip can be exploited to a greater extent to produce the decor, which makes it possible to envisage more varied possibilities for producing the decor.

The decor herein can be formed of one or more layers.

According to an exemplary implementation, the step of applying the decor comprises at least one step of printing at least one layer of decor.

In a particular exemplary embodiment, the decor can then be silver or gold, for example formed of a silver or gold color print, and a white color print (or of another color).

According to an interesting example, the step of applying a decor comprises a step of applying a decor background to the surface of the body, over the magnetic strip.

The magnetic strip is then placed between the decor background and the surface of the body.

The decor background is, for example, a layer of solid color, for example of a white color.

According to another example, the decor background may comprise a pattern and/or be of several colors (polychrome or monochrome of several levels).

According to an interesting example, the step of applying a decor comprises a step of applying an illustration layer, possibly over the decor background if there is one.

The magnetic strip is then placed between the illustration layer and the surface of the body.

Indeed, the decor background is then comprised between the magnetic strip and the illustration layer.

According to another interesting example, the step of applying a decor also comprises a step of applying a protective layer, over the decor background and/or over the illustration layer.

The protective layer is for example a varnish, for example a clear varnish.

Thus, the decor comprises, for example, a decor background, an illustration layer and/or a protective layer.

According to a first option, the decor background, the illustration layer and/or the protective layer are assembled beforehand, i.e., superimposed, and the decor thus formed is applied over the magnetic strip.

Or, according to a second option, the decor background is applied to the magnetic strip, then the illustration layer is applied to the decor background and/or the protective layer is applied to the illustration layer or directly to the decor background.

Thus, in an interesting embodiment, the decor is designed to conform to a final image.

For this, for example, the inks used to obtain the desired final image will depend on the decor background and the illustration layer.

Considering a decor background formed from white ink, if the decor background is very opaque, the inks of the illustration layer can be chosen for a print considered to be "on a white background".

On the other hand, if the decor background is less opaque, it then gives "a gray effect" (considering for example that the decor background is formed by white ink but is not very opaque, whereas the magnetic strip is generally black), then the choice of ink colors of the illustration layer will be modified to obtain the final image, i.e., the decor of the desired opacity.

In an exemplary implementation, the step of applying the decor comprises a step of screen printing from a fabric having a mesh of at least 100 LPI ("Line Per Inch"), or even 120 LPI.

The unit LPI ("line per inch"), or LPC ("line per cm"), is a standard unit of measurement in the field of screen printing to define the number of threads per inch, or centimeter, of the fabric used for this type of printing.

According to an exemplary implementation, the step of applying the magnetic strip to at least part of the surface of the body comprises a step of printing an ink on at least part of the surface of the body, the ink being designed to form the magnetic strip.

The ink is for example a magnetic ink.

According to another exemplary implementation, the step of applying the magnetic strip to at least part of the surface of the body comprises a step of providing a tape, the tape comprising a backing and the magnetic strip, applied to the backing, and a step of transferring the magnetic strip from the tape backing to the surface of the body.

The magnetic strip is then, for example, placed between the surface of the body and the tape backing.

The tape backing is for example a sheet, for example a plastic sheet, for example made of PET (poly(ethylene terephthalate), also called polyethylene terephthalate), a surface for which is provided with the magnetic strip.

For example, the step of transferring the magnetic strip from the tape to the surface comprises a step of laminating the tape with the surface of the body.

The lamination can be performed hot or cold with the help of an adhesive.

According to an exemplary implementation, the method comprises a step of providing a substrate comprising a surface of any color then a step of applying a layer of a second color to the surface of the substrate of any color, the second color layer forming the surface of the body of the document.

For example, the step of applying a layer of the second color to the surface of the substrate of any color comprises a step of printing an ink of the second color on the surface of the substrate of any color.

For this, all types of printing method may be suitable, for example lithography, screen printing, flexography, inkjet, or others.

According to another exemplary implementation, the method comprises a step of providing a substrate tinted throughout by a second color over at least part of its thickness from an upper surface, the upper surface of the substrate tinted throughout forming the surface of the body of the second color.

A second aspect also proposes an electronic document comprising a concealed magnetic strip obtained by a method as described above.

In particular, such an electronic document comprises:

- A body comprising a surface,
- A magnetic strip applied to at least part of the surface of the body, the surface of the body covered at least in part by the magnetic strip forming a visible surface having a Delta E contrast equal to or less than 15, or even 10, and
- A decor applied to the surface of the body and covering the magnetic strip, the decor having a thickness of at most 10 μm and having an opacity ratio at wavelengths in the visible range of at least 70%.

Such an electronic document thus has advantages similar to those presented above as part of the method.

In an exemplary embodiment, the magnetic strip covers the entire surface of the body.

The visible surface is then formed by the magnetic strip. The Delta E contrast is then 0 (zero).

In an exemplary embodiment where the magnetic strip covers only part of the surface of the body, the Delta E contrast is determined between a first color of the magnetic strip and a second color of the surface of the body.

In an exemplary embodiment, the decor comprises a decor background.

For example, the decor background is applied to the surface of the body and covers the magnetic strip.

The decor background is, for example, a layer of solid color, for example of a white color.

According to another example, the decor background may comprise a pattern and/or be of several colors (polychrome or monochrome of several levels).

According to one embodiment option, the decor comprises an illustration layer.

For example, the illustration layer may be applied to the decor background.

In an exemplary embodiment, the decor comprises a protective layer that is applied to the decor background or to the illustration layer.

The protective layer is for example a varnish, for example a clear varnish.

According to one embodiment, the body of the electronic document comprises a substrate comprising a surface of any color and a layer of a second color applied to the surface of the substrate of any color, the second color layer forming the surface of the body of the document to which the magnetic strip is applied.

According to another embodiment, the body of the electronic document comprises a substrate tinted throughout by a second color over at least part of its thickness from an upper surface, the upper surface of the substrate tinted throughout forming the surface of the body of the document to which the magnetic strip is applied.

Figure 2:
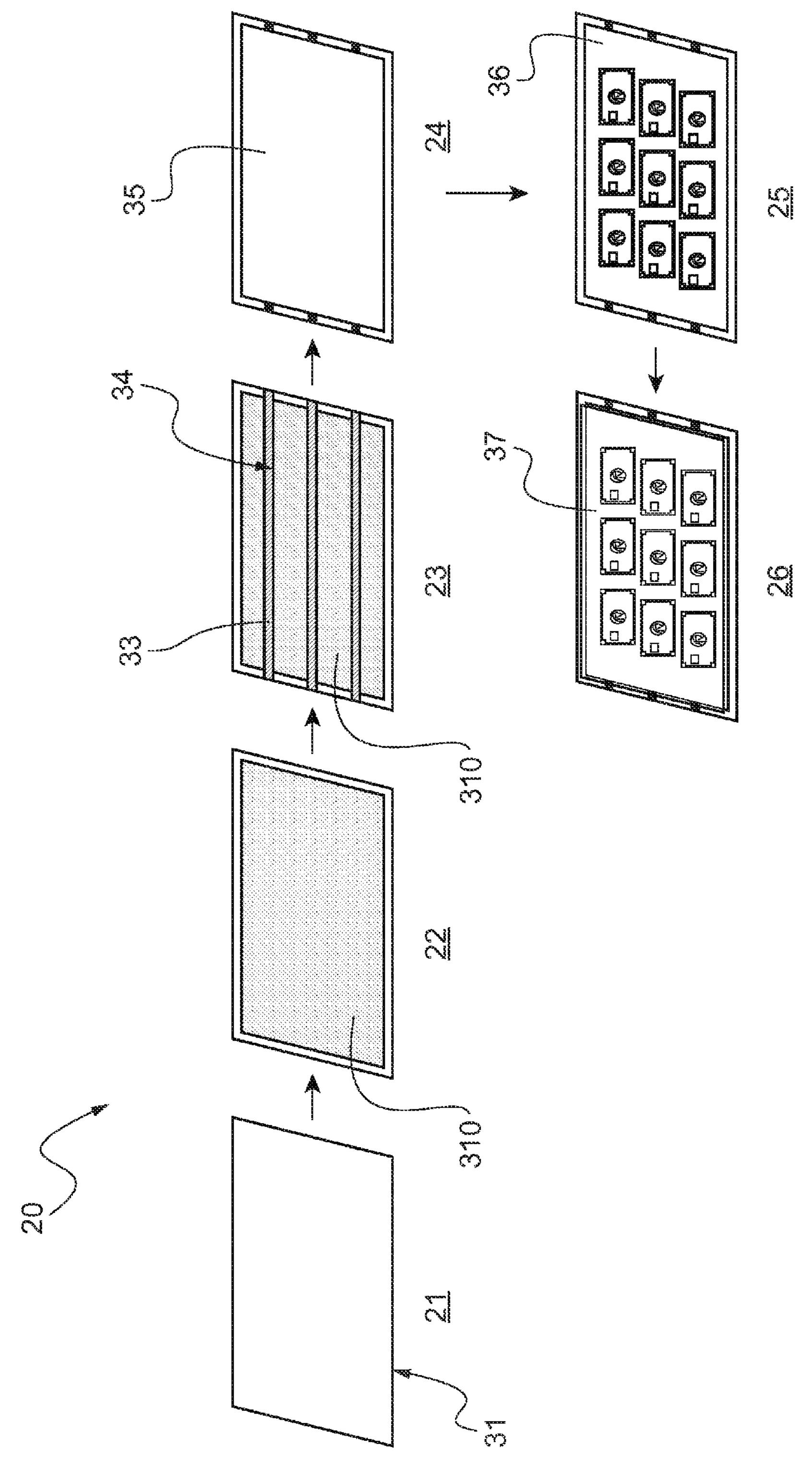
Figure 3:
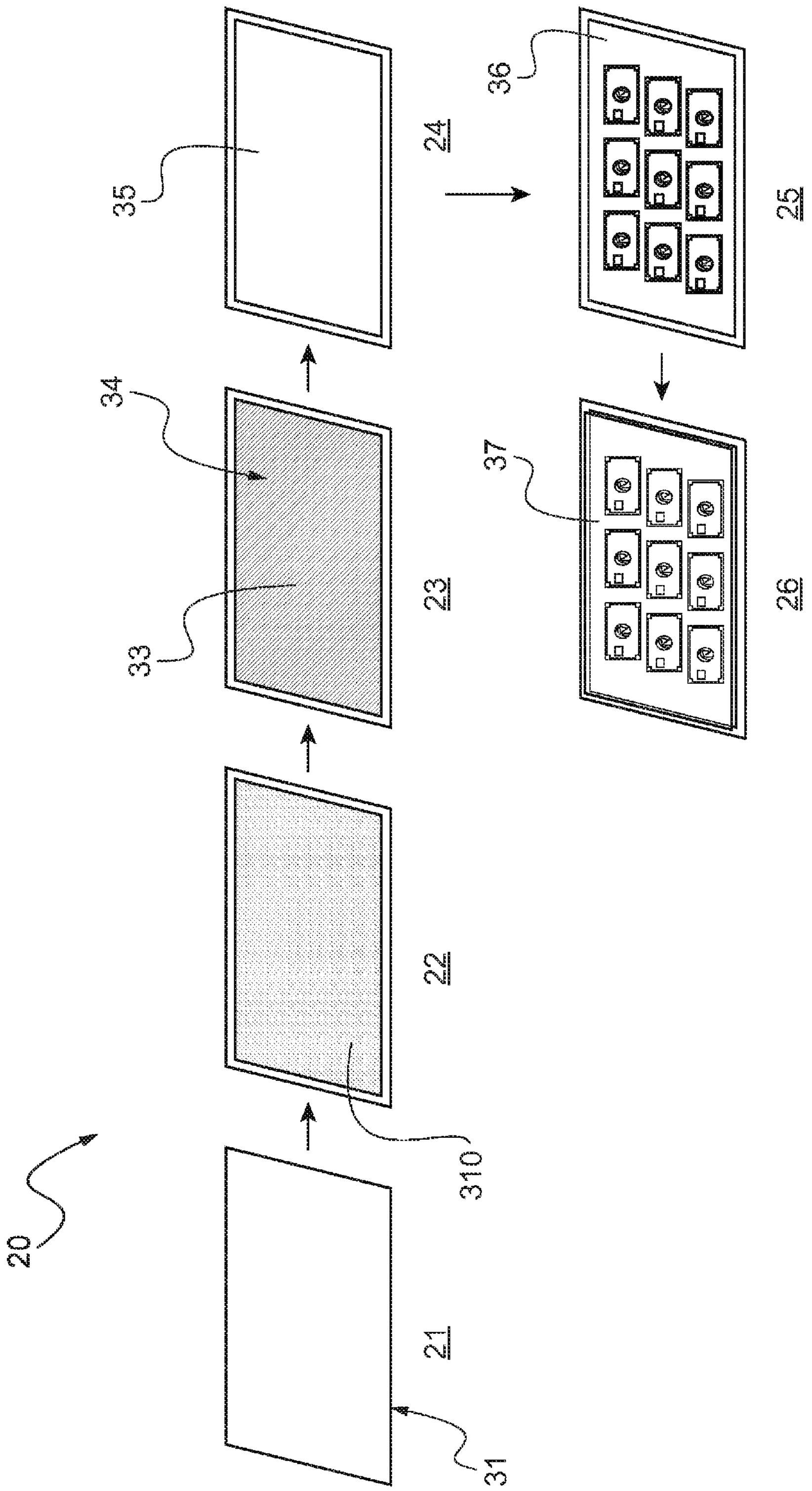
Figure 4:
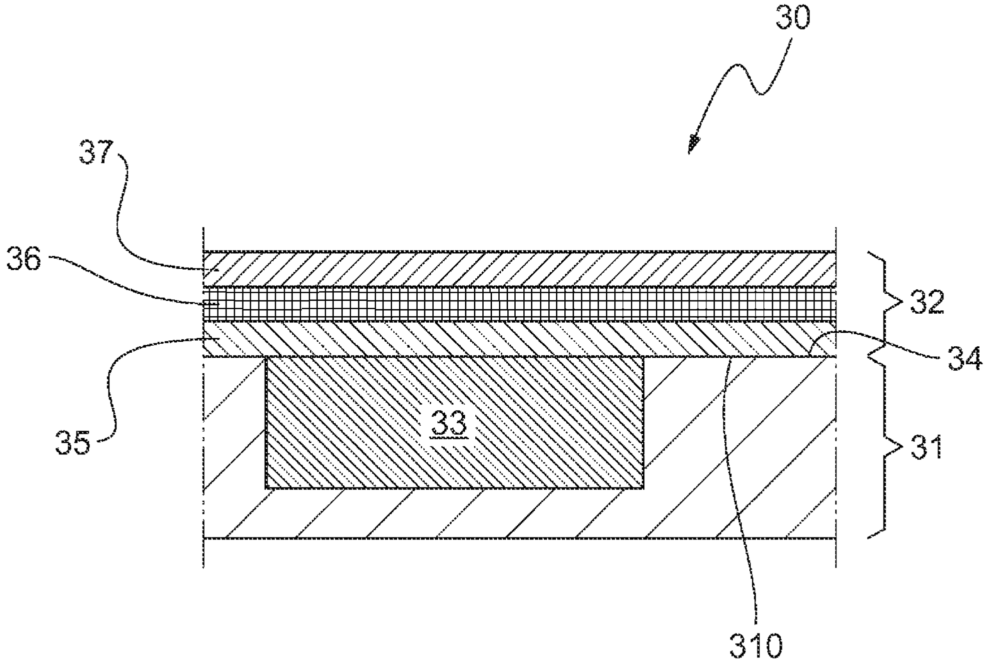

The invention, according to an example embodiment, will be better understood and its advantages will be better seen by reading the following detailed description, given as a non-limiting example, referring to the appended drawings wherein:

FIG. 1 schematically illustrates the main steps of a traditional method for producing a document comprising a concealed magnetic strip;

FIG. 2 schematically represents a method for producing an electronic document comprising a concealed magnetic strip according to an exemplary implementation of the invention;

FIG. 3 schematically represents a method for producing an electronic document comprising a concealed magnetic strip covering the entire surface of the body according to another exemplary implementation of the invention; and FIG. 4 illustrates, in cross-section, an electronic document comprising a concealed magnetic strip according to an embodiment of the invention.

The identical features depicted in the above-mentioned figures are identified by identical numerical references.

FIG. 1 presents the main steps of a method 10 for producing an electronic document comprising a concealed magnetic strip according to the prior art.

Such a method 10 typically comprises a step 11 of assembling at least one magnetic strip on a surface of an electronic document body.

Traditionally, a magnetic strip is black, possibly gray, while the body of the electronic document, and a fortiori its surface to which a magnetic strip is applied, is white.

There is therefore a significant contrast between the magnetic strip and the body.

In order to conceal the magnetic strip, the method then typically comprises a step 12 of applying a silver layer (i.e., considered gray in color, for example by screen printing), which then represents a first step to break the contrast between the white of the body and the black of the magnetic strip. To achieve satisfactory coverage, the silver layer generally has a thickness of at least 4 μm.

Then, the method generally comprises a step 13 of applying a layer of white color (also called "white layer"), for example also by screen printing), which then represents a second step to reduce the contrast between the white of the body and the black of the magnetic strip, but in addition, this white layer serves as a background to then apply a decor to the surface of the electronic document, as shown here in steps 14 and 15.

Thus, for example, the method then comprises a step 14 of applying illustrations, for example by lithography, to the background formed by the white layer; then the method comprises a step 15 of applying a varnish, for example by screen printing, to protect the illustrations.

Consequently, with such a method, the resulting electronic document comprises at least two so-called "concealing" layers over the magnetic strip, namely the silver layer (applied here in step 12) and the white layer (applied here in step 13), then the illustration layer (from step 14 here) and the varnish layer (from step 15 here).

The assembly of layers applied during steps 12 to 15 generally represent a thickness of between 7 μm and 12 μm and this assembly tends to diminish the capabilities of the magnetic strip.

Consequently, a method 20 according to an exemplary implementation of the invention is shown schematically in FIG. 2.

The method 20 for producing an electronic document comprising a concealed magnetic strip according to an exemplary embodiment of the invention then comprises for example a step 23 of applying a magnetic strip 33 of a "first" color, for example here a black color, to a part of a surface 310 of an electronic document body (shown here at step 22), the surface 310 being of a "second" color, for example herein also a black color.

In the present exemplary embodiment, an electronic document is cut out from a board that can contain several series of electronic document formats (for example 24).

Herein, for illustrative purposes, the figures represent a board that can contain three series of several formats, hence the presence of three magnetic strips 33.

The body of the document then has a visible surface 34 formed by the surface 310 of the uncovered body and by one of the magnetic strips 33.

Thus, a Delta E contrast is then determined between the second color, of the surface 310 of the unmasked body, and the first color, of the magnetic strip 33.

Considering that they are both black, the Delta E contrast is then herein less than 10, or even substantially close to zero (0).

In addition, the method comprises for example a step 24, 25, 26 of applying a decor 35, 36, 37 over the magnetic strip 33.

The decor 35, 36, 37 has a thickness of at most 10 μm and is opaque to wavelengths in the visible range.

This decor is applied by traditional printing methods, such as offset printing and screen printing. In the context of this example of the invention, the single-color layers are produced by screen printing, while the multi-colored layers are produced by offset.

Thus, not only is it possible to dispense with a silver concealing layer, but in addition it is possible to apply fewer layers over the magnetic strip.

Herein, the decor comprises for example a decor background 35, an illustration layer 36 and a protective layer 37.

Consequently, the method comprises a step 24 of applying a decor background 35 over the magnetic strip 33.

The decor background 35 is for example a solid color layer, for example of white color as shown here by way of example only, and it could be otherwise. According to another example, the decor background may comprise a pattern and/or be of several colors (polychrome or monochrome of several levels).

Thus, the magnetic strip 33 is then arranged between the decor background 35 and the surface 310 of the second color of the body.

The method also comprises a step 25 of applying an illustration layer 36 over the decor background 35.

The decor background 35 is then comprised between the magnetic strip 33 and the illustration layer 36.

The illustration layer 36 thus shows here that three series of electronic documents are formed here, in line with the three magnetic strips 33 produced on the surface 310.

And finally, the method also comprises a step 26 of applying a protective layer 37, herein over the illustration layer 36.

The protective layer 37 is for example a varnish, for example a clear varnish.

For example, in the present example illustrated in FIG. 2, the step 24 of applying a decor background 35 over the magnetic strip 33 is carried out by screen printing; the step 25 of applying an illustration layer 36 over the decor background 35 is carried out by offset; and the step 26 of applying a protective layer 37, herein over the illustration layer 36, is preferably also carried out by screen printing.

In addition, in the implementation example of FIG. 2, the method comprises a step 21 of providing a substrate 31 comprising a surface of any color, herein of white color, then a step 22 of applying a layer of the second color to the surface of the substrate 31 of any color, the second color layer forming the surface 310 of the body of the document.

The substrate 31 then forms at least part of the body of the electronic document. According to an example not shown, steps 21 and 22 could be grouped together by producing a substrate 31 of the second color, for example tinted throughout, for example black.

In the exemplary embodiment of FIG. 3, the method steps are identical to those of FIG. 2.

The example of FIG. 3 differs from that of FIG. 2 in that the magnetic strip 33 is designed to cover the entire surface of an electronic document body.

In this case, the magnetic strip 33 covers an entire surface of the board in which the electronic document is subsequently cut.

In this case the Delta E contrast is then 0 (zero).

By virtue of this zero contrast, it would be possible to dispense with the decor background 35 (this step is however represented here by analogy with FIG. 2 and taking into account the patterns shown schematically for illustrative purposes, but it is optional), thus leaving a greater possibility of choice of the layers constituting the illustration layer 36 and the protective layer 37 to obtain new visual aesthetic effects.

An example of an electronic document 30 obtained at the end of a method such as represented in FIG. 2, or FIG. 3, is shown schematically in FIG. 4, in cross-section.

In this figure, the electronic document 30 with concealed magnetic strip comprises:

- A body comprising a surface 310, of a second color,
- A magnetic strip 33, of a first color applied, to at least part of the surface 310 of the body, and
- A decor 32 applied to the surface 310 of the body and covering the magnetic strip 33.

The surface 310 of the body covered at least in part by the magnetic strip 33 and the magnetic strip thus form a visible surface 34 having a Delta E contrast equal to or less than 15, or even 10.

In the case of an electronic document 30 obtained at the end of the method as represented in FIG. 3, the magnetic strip 33 covers the entire surface 310 and the visible surface 34 is then formed by the magnetic strip 33. The Delta E contrast is then close to zero, or equal to zero.

The decor 32 has a thickness of at most 10 μm and is opaque to wavelengths in the visible range.

Herein, the decor 32 comprises a decor background 35, an illustration layer 36 that is applied to the decor background 35, and a protective layer 37 that is applied to the illustration layer 36.

The protective layer 37 is for example a varnish, for example a clear varnish.

In the exemplary embodiment of FIG. 4, the body of the electronic document 30 comprises a substrate 31 comprising a surface of any color and a layer of the second color applied to the surface of the substrate 31 of any color, the second color layer forming the surface 310 of the body of the document 30 to which the magnetic strip 33 is applied.

However, the substrate 31 could be tinted throughout by the second color, at least over part of its thickness from its surface forming the surface 310 of the second color.

The invention claimed is:

1. A method for producing an electronic document including a magnetic layer that is concealed, the method comprising:

- providing a surface of an electronic document body;
- applying the magnetic layer to at least part of the surface of the electronic document body to form a layered surface formed by the surface of the body covered at least in part by the magnetic layer, the layered surface having a Delta E contrast equal to or less than 15; and
- subsequently applying a decor covering the layered surface over the applied magnetic layer after applying the magnetic layer to at least the part of the surface of the body, the decor having a thickness of at most 10 μm and having an opacity ratio at wavelengths in the visible domain of at least 70%.

2. The method according to claim 1, wherein the applying the magnetic layer to at least the part of the surface of the body comprises printing an ink on at least the part of the surface of the body, the ink being configured to form the magnetic layer.

3. The method according to claim 1, wherein the applying the magnetic layer to at least part of the surface of the body comprises applying the magnetic layer over the entire surface of the body.

4. The method according to claim 1, wherein the applying the magnetic layer to at least part of the surface of the body includes providing a tape comprising a backing and the magnetic layer, applied to the backing, and transferring the magnetic layer from the backing of the tape onto the surface of the body.

5. The method according to claim 1, further comprising:

providing a substrate comprising a surface of any color, and then applying a layer of a second color to the surface of the substrate of any color, the second color layer forming the surface of the body of the document.

6. The method according to claim 1, further comprising providing a substrate tinted throughout with a second color over at least part of its thickness from an upper surface, the upper surface of the substrate tinted throughout forming the surface of the body of the second color.

7. The method according to claim 1, wherein the applying the decor comprises applying a decor background to the surface of the body, over the magnetic layer.

8. The method according to claim 1, wherein the applying the decor comprises applying an illustration layer.

9. The method according to claim 1, wherein the applying the decor comprises applying a decor background to the surface of the body, over the magnetic layer, and applying an illustration layer.

10. The method according to claim 1, further comprising applying a protective layer over the decor.

11. An electronic document including a magnetic layer that is concealed, the electronic document comprising:

a body comprising a surface;

a magnetic layer applied to at least part of the surface of the body, the surface of the body covered at least in part by the magnetic layer forming a layered surface having a Delta E contrast equal to or less than 15; and a decor applied to the layered surface and covering the magnetic layer when the magnetic layer is affixed to at least the part of the surface of the body, the decor having a thickness of at most 10 μm and having an opacity ratio at wavelengths in the visible domain of at least 70%.

12. The electronic document according to claim 11, wherein the magnetic layer covers the entire surface of the body.

13. The electronic document according to claim 11, wherein the decor comprises a decor background applied to the surface of the body and covering one or more of the magnetic layer and an illustration layer.

14. The electronic document according to claim 11, wherein the body of the electronic document comprises a substrate comprising a surface of any color and a layer of a second color applied to the surface of the substrate of any color, the second color layer forming the surface of the body of the document to which the magnetic layer is applied.

15. The electronic document according to claim 11, wherein the body of the electronic document comprises a substrate tinted throughout with a second color over at least part of its thickness from an upper surface of the substrate tinted throughout forming the surface of the body of the document to which the magnetic layer is applied.

* * * * *